(12) United States Patent
Clark et al.

(10) Patent No.: US 6,591,882 B1
(45) Date of Patent: Jul. 15, 2003

(54) TRACTION DEVICE FOR VEHICLE TIRES

(75) Inventors: Larry C. Clark, Amity, OR (US);
Robert K. Anderson, Portland, OR (US); Gary M. Scott, Milwaukie, OR (US)

(73) Assignee: Burns Bros., Inc., Lake Oswego, OR (US)

( * ) Notice: Subject to any disclaimer, the term of this patent is extended or adjusted under 35 U.S.C. 154(b) by 0 days.

(21) Appl. No.: 10/053,105

(22) Filed: Jan. 17, 2002

(51) Int. Cl.[7] .............................................. B60C 11/00
(52) U.S. Cl. .................................. 152/213 R; 152/231
(58) Field of Search ............................ 152/213 R, 231, 152/232, 233, 239, 241, 242, 243, 244, 245, 225 R, 226, 228, 229

(56) References Cited

U.S. PATENT DOCUMENTS

| | | | |
|---|---|---|---|
| 1,713,360 A | * | 5/1929 | Woodling et al. ........ 152/213 R |
| 2,059,100 A | * | 10/1936 | Green .................... 152/213 A |
| 2,671,364 A | * | 3/1954 | Baxter, Jr. ............... 152/213 R |
| 2,743,754 A | * | 5/1956 | Macesh .................... 152/213 R |
| 4,274,463 A | * | 6/1981 | Freeman ................... 152/213 R |
| 4,416,319 A | * | 11/1983 | Hofmann ................... 152/172 |
| 4,799,522 A | * | 1/1989 | Ilon ........................ 152/213 R |

* cited by examiner

*Primary Examiner*—S. Joseph Morano
*Assistant Examiner*—Long Bao Nguyen
(74) *Attorney, Agent, or Firm*—Robert L. Harrington; Schwabe Williamson & Wyatt

(57) ABSTRACT

A tire chain for adding traction to a vehicle tire riding on snow and/or ice. The tire chain includes side members encircling the sides of the tires and cross members that extend across the tread from side member to side member. Securement devices secure the cross members to the side members. The securement devices include a hook shape defining an enclosure and an opening to the enclosure and a biasing member that spans the opening. The securement device is secured to one of the members and is snap locked onto the other member to enable manual removal of a selected one of the cross members for replacement.

17 Claims, 9 Drawing Sheets

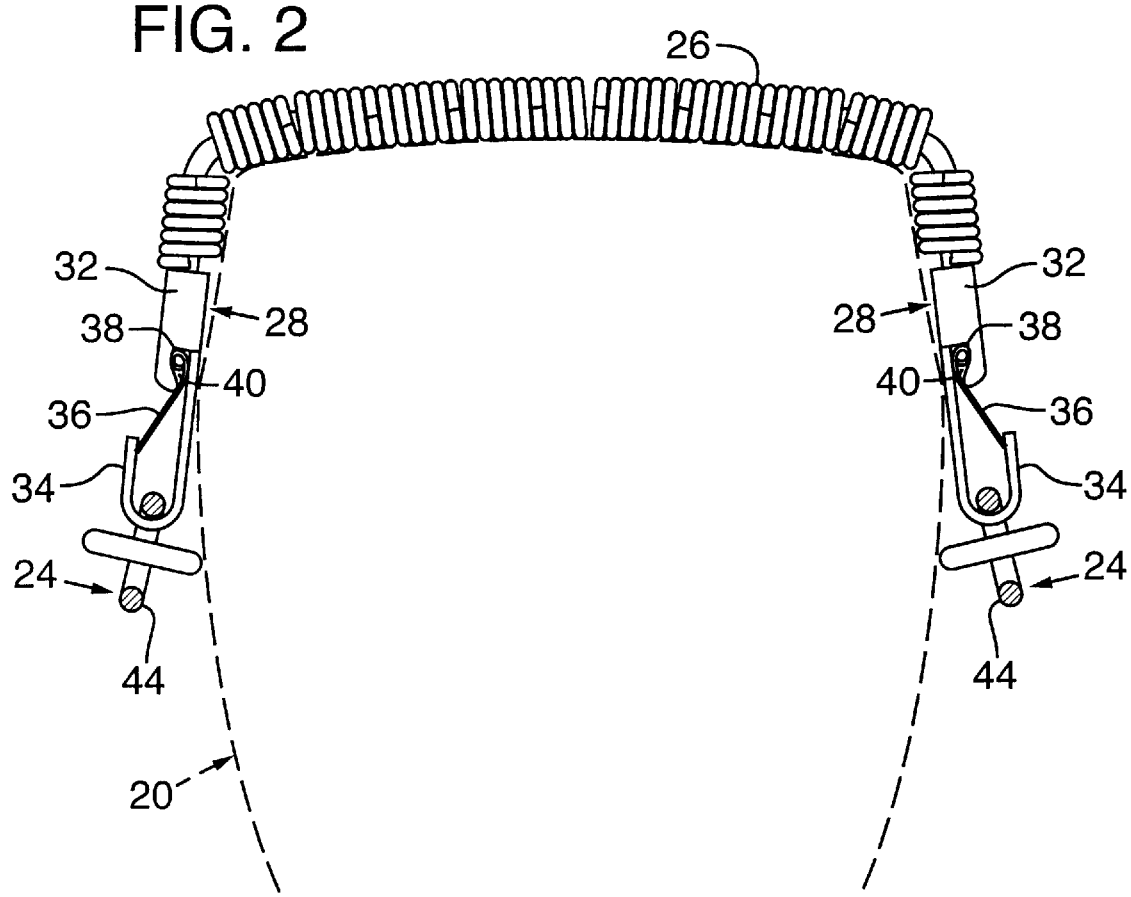

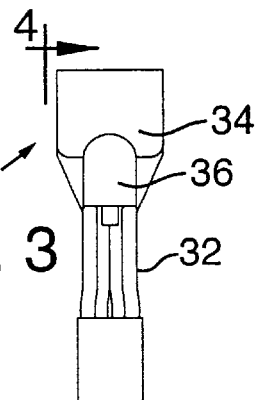
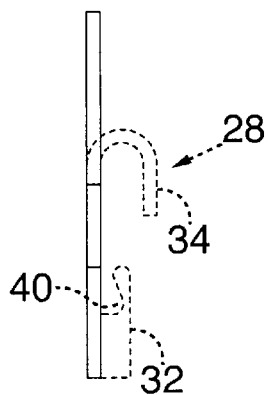
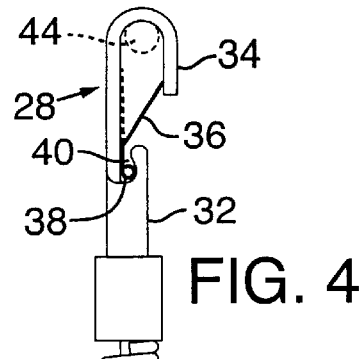
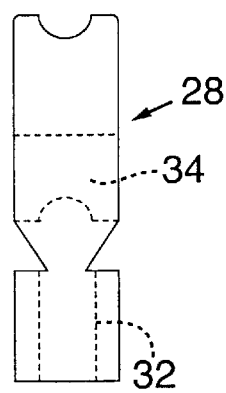
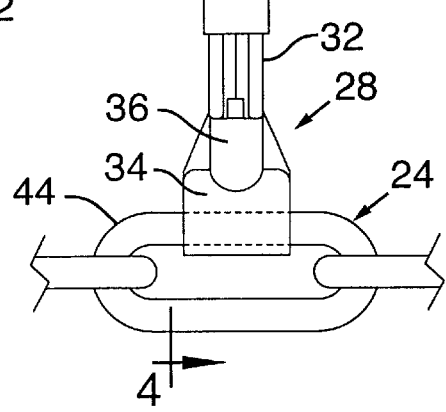
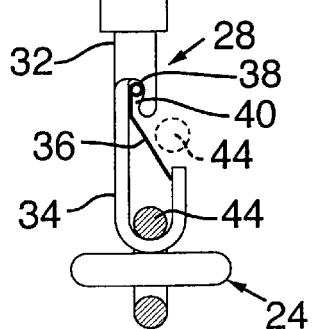

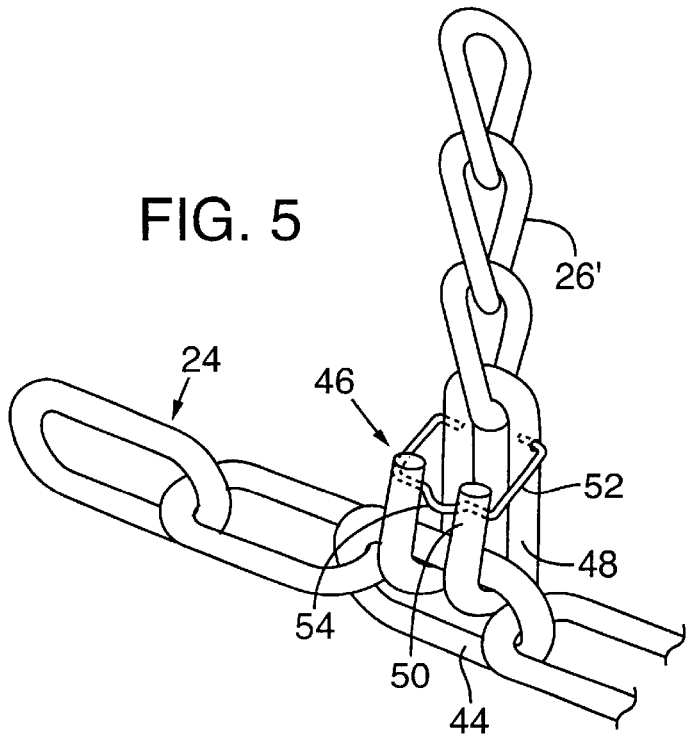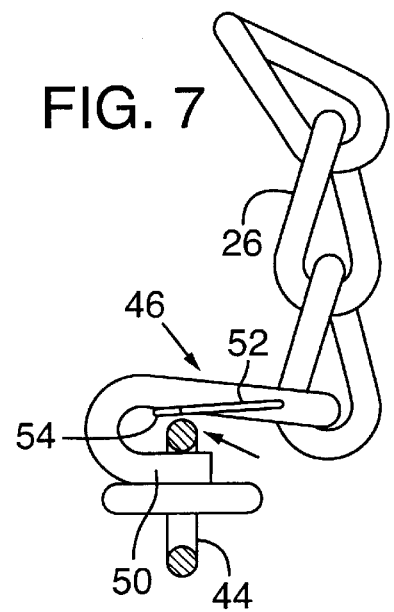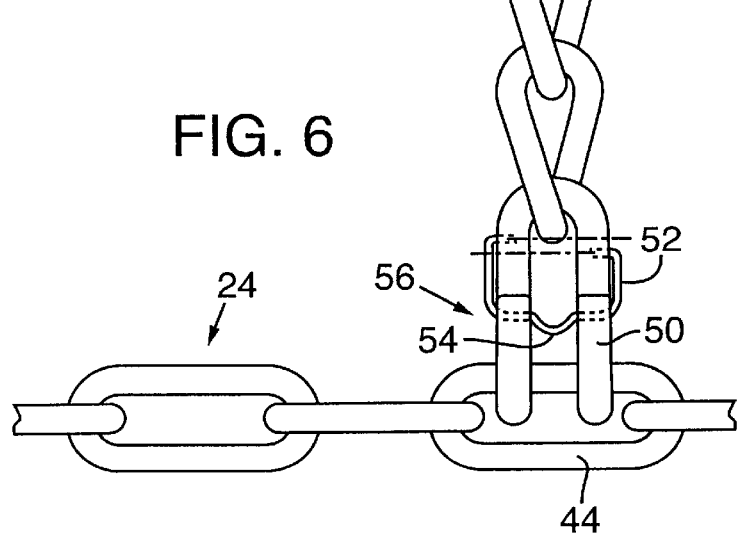

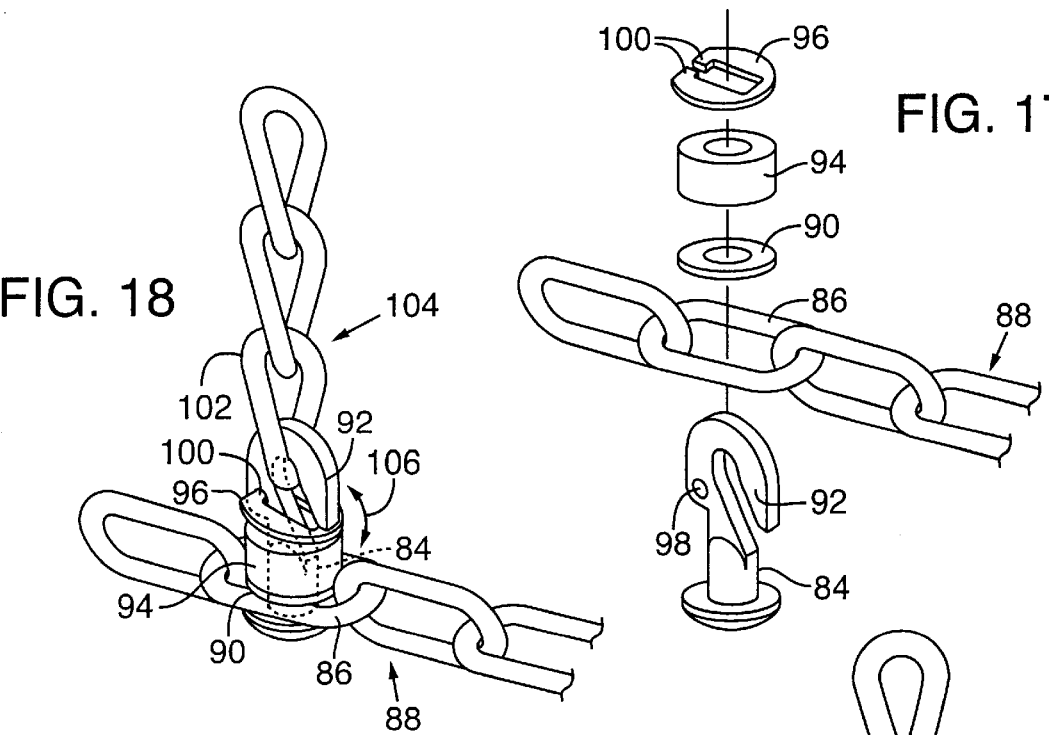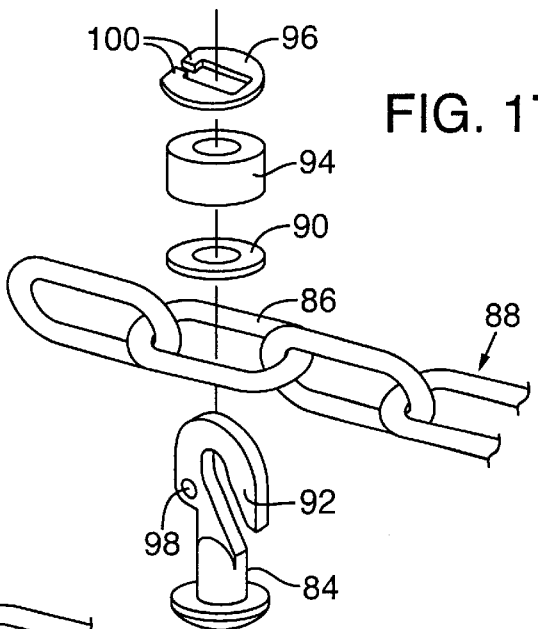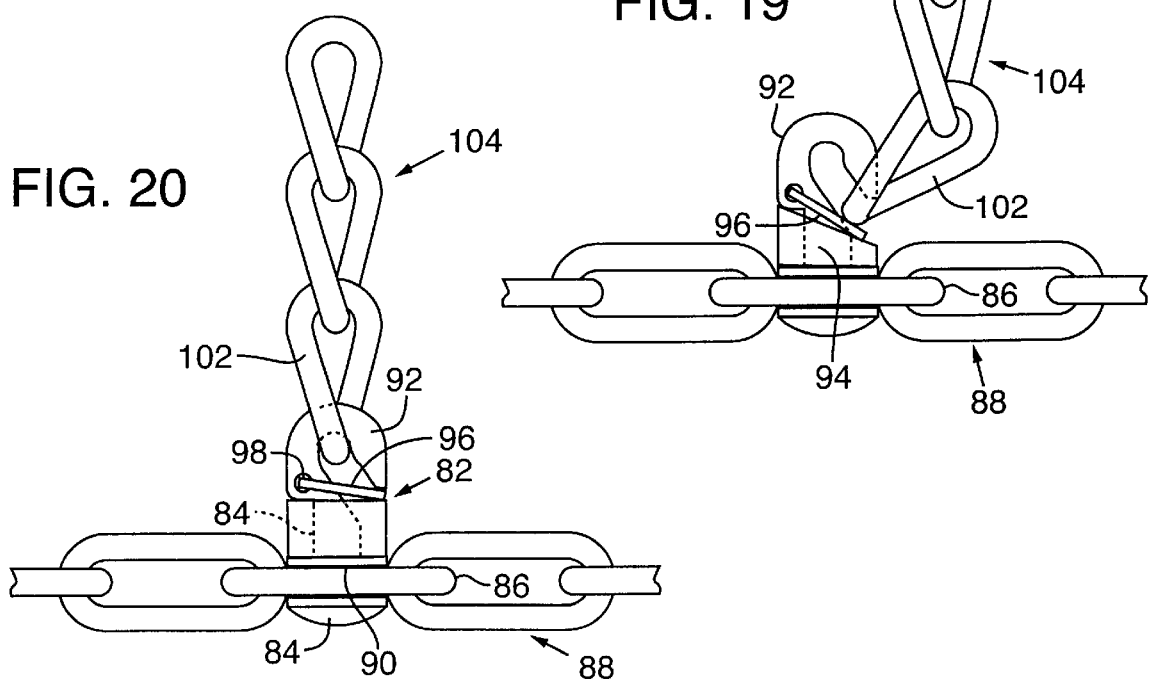

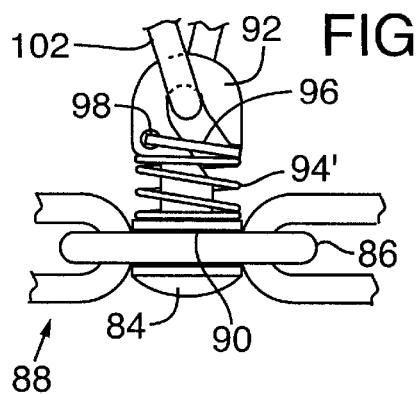
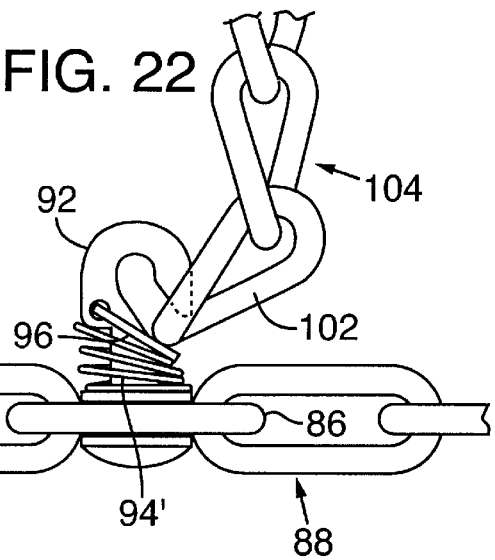
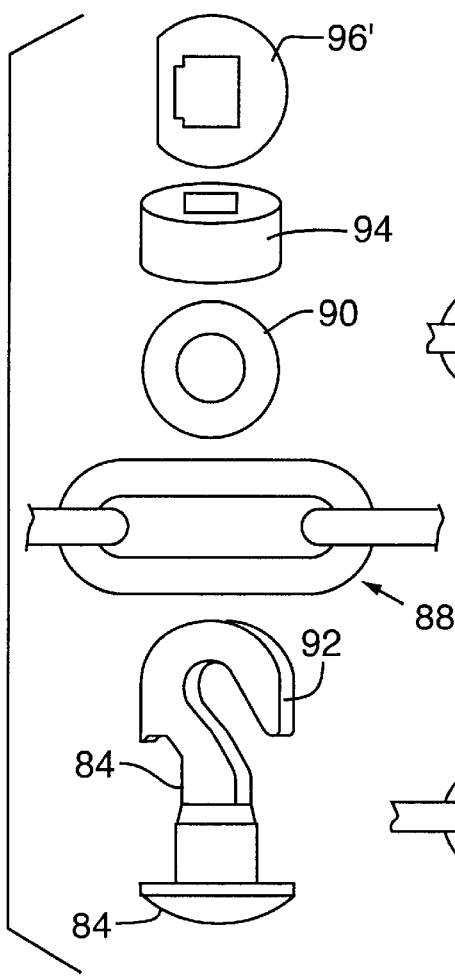
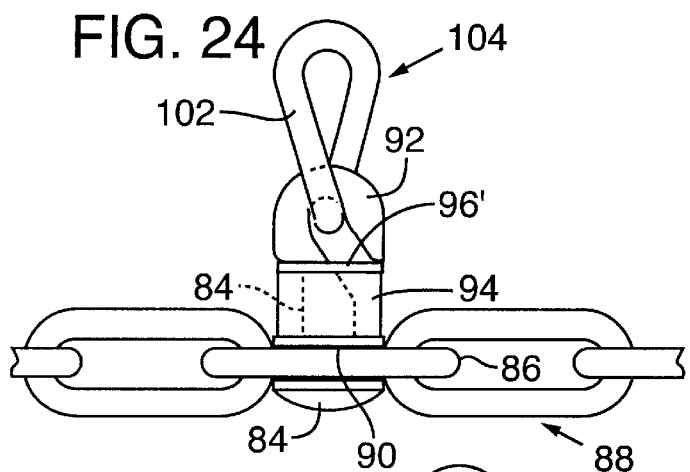
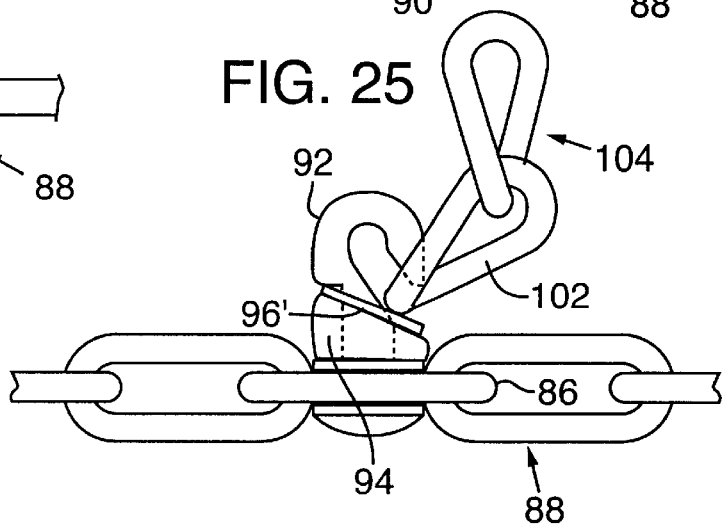

TRACTION DEVICE FOR VEHICLE TIRES

FIELD OF THE INVENTION

This invention relates to a tire chain for enhancing gripping of a tire in conditions of snow and ice and more particularly to the replacement of worn or broken cross members.

BACKGROUND OF THE INVENTION

Tire chains as contemplated herein are intended for mounting to driven wheels of a vehicle when a roadway is covered with snow or ice. Mounting to non-driven wheels in addition to driven wheels is optional for maximum control in severe conditions. Additionally, the use of traction devices such as tire chains is required by law when driving on snow and ice covered roads in several states, notably California, Oregon and Washington. Tire chains are not intended for dry road surfaces and the chain's cross members (which wrap across the tire tread between two side members) will rapidly wear when driven on dry road surfaces. Thus, the chains are to be demounted from the tire as a vehicle enters and exits ice and snow laden road conditions.

A vehicle needs to be driven at a reduced speed when driving on traction devices/tire chains. A chain component that breaks or comes loose can cause damage to the vehicle being driven at a high speed. Even at slow speeds a broken cross member requires that the vehicle be stopped and the tire chain repaired or replaced. The present invention is directed to a releasable securement device for releasably securing cross members to a tire chain side member as when replacing a broken cross member and particularly when cross member replacement is required by the vehicle's driver while on the road and between destinations.

BRIEF DESCRIPTION OF THE INVENTION

It is to be understood that the terms traction chains, traction devices or tire chains refer to that product which includes a pair of circular side members designed to extend around the opposed side walls of a tire, the side members connected together by cross members that wrap across the tire tread from side member to side member. (See FIG. 1) The side members may be loops of cable, a steel hoop, plastic, composite material or loops of interconnected links. The cross members may be lengths of cable or lengths of interconnected links or plastic or composite material and the side members and cross members of a given chain may be any combination, i.e., cable cross members and cable side members, cable cross members and link side members, link cross members and cable side members or link cross members and link side members, composite cross members and link side members, cable cross members and steel hoop side members, etc.

The problem of cross member replacement has existed since tire chains were first adopted for enhanced tire traction on ice and snow. The problem has existed particularly for truck drivers having to traverse mountain regions when hauling loads cross country. The sheer weight and power of a large truck both accelerates the wearing of tire chains and the likelihood of cross member breakage when weakened by wearing. It is accordingly not uncommon for truck drivers to have to pull over along snow/ice laden roadways and replace a broken cross member. Not replacing or repairing the chain is not an option as the loose cross member is then whipped around the side of the tire and can wrap around or impact various objects in the vicinity of the wheel and cause immeasurable damage and safety hazards.

Heretofore replacement of cross members typically required the removal or at least the loosening of the tire chain and then the wielding of a large pliar-like tool to force open a metal clamp securement device. A replacement cross member would then have to be secured to the side member again by the wielding of the pliar-like tool to squeeze shut the open clamp. Alternatively, and particularly when the pliar-like tool was not available to a driver, the cross member was repaired in a very temporary manner using a wire wrap or repair link to secure the cross member to the side member. Such was intended only for a temporary fix to enable the driver to limp cautiously to the closest point of shop repair hoping other cross members wouldn't break along the way.

The preferred embodiment of the present invention provides a secure, finger actuated snap lock-type releasable securement device permanently affixed to each end of a cross member. The cross member as initially assembled to the side member is snap locked to the side members by the securement devices. When replacement is required, the driver merely presses a spring of each securement device to allow disassembly by hand and a replacement cross member is snap locked to the side member in its place. The design of the invention also allows for actuation with common hand tools if desired.

In one embodiment, the clamp is a metal plate that is formed into a hook shape at one end and crimped at the other end onto the cross member. A metal spring (e.g., leaf spring) is anchored to said other end and extends to a position at the opening of the hook shape. A side cable or side link is pressed against the metal spring bending it out of the way as the cable or side link is forced into the hook. The metal spring snaps back to close off the opening and prevents removal of the side member except by intentional deflection of the metal spring.

Other variations include elastomer springs that accomplish a similar function as the metal spring. Several embodiments are disclosed in the detailed description which follows having reference to the accompanying drawings.

DESCRIPTION OF THE DRAWINGS

FIG. 2 is a cross sectional view as taken on view lines 2—2 of FIG. 1;

FIG. 3 is a top view of a cross member of the tire chain of FIG. 1 and FIGS. 3A and 3B illustrate the formation of a securement for the cross member;

FIG. 4 is a side view of the cross member of FIG. 3 as indicated by view lines 4—4 in FIG.

FIG. 5 is a perspective view, FIG. 6 is a side view and FIG. 7 is an end view showing assembly of a snap lock configuration of a link-type cross member connected to a link-type side member in accordance with a second embodiment of the invention.

FIGS. 17–20 illustrate a still further embodiment of the invention; and

FIGS. 21–25 illustrate modifications to the embodiment of FIGS. 17–20.

DETAILED DESCRIPTION

Figure 1:
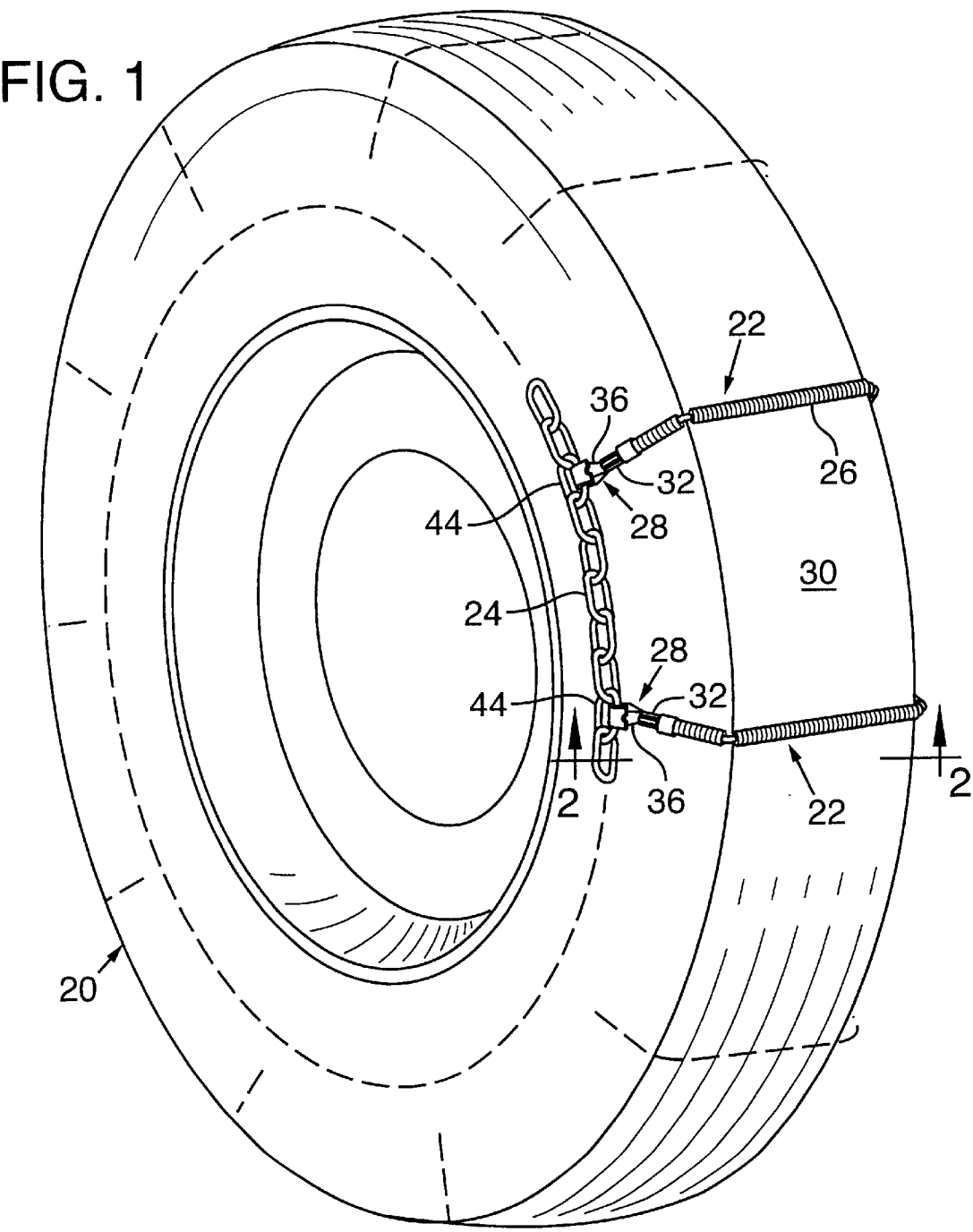
FIG. 1 illustrates a vehicle wheel including a tire having one type of tire chain or traction device (a "ladder" style) incorporating a releasable securement device in accordance with the present invention.

Reference is made to FIGS. 1 and 2 which illustrate a vehicle wheel 20 having a tire chain 22 (alternatively "traction device") mounted on the wheel. Shown in the FIG. 1 embodiment is a link-type side member 24 and cable-type cross member 26. FIG. 2 is a side view of a single cross member 26 that more clearly illustrates the manner of securing the cross member 26 to the side members 24 using a securement device 28 in accordance with the first embodiment of the invention.

It will be appreciated, and as well known to users of such traction devices, the tire chain when mounted to a tire and mounted on a vehicle and driven on ice or snow is subjected to varying forces that induce wear and breakage of the device and particularly the cross members. On an icy road the tread portion 30 of the wheel 20 tends to slip whereas the cross members 26 dig into the ice and resist slippage. The side members 24 are tightly held against the tire and thus the connection between the side members and cross members have to withstand the opposing forces acting against the cross members and the side members of the traction device. The configuration of the securement device 28 must be such as to withstand these opposing forces. However, these forces are primarily pulling forces and sometimes twisting forces as applied to the securement device 28. Minimal or no force is acting to push the side member and cable portions together, i.e., to collapse or compress the securement device.

Reference is now made to FIGS. 3 and 4 which are enlarged and more detailed views of the cross members 26 and securement device 28 but including a partial view of side members 24. As mounted on a tire, the view of FIG. 3 is an outside view, i.e., the side of the securement device exposed for viewing when mounted on the tire and will sometimes be referred to as the top view of the cross member. This is the side that contacts the road as the cross member is rolled under the tire. FIG. 4 is a side view of the cross member. These views show the cross member laid straight for illustration purposes but of course they take a U-shape when mounted on a tire as seen in FIG. 2.

The cross member 26 as previously indicated is a cable-type cross member and other than the portion thereof referred to as the securement device 28, is a construction well known to the industry and will not be further explained. The securement device 28 of this first embodiment is primarily constructed from a flat steel plate as illustrated in FIGS. 3A and 3B. The inner end 32 is folded around its longitudinal axis and crimped onto the cable end (solid line to dash line) and the outer end 34 is folded along a lateral axis into a hook shape (also solid line to dash lines).

Returning to FIGS. 3 and 4, attached to the formed plate is a metal spring 36 (see FIG. 4). One end of the spring 36 is a roll form 38 and is secured in a notch 40 provided in the formed plate. The metal spring 36 is permanently biased to a position across the hook opening as shown in solid lines and can be depressed inwardly as illustrated in dash lines at the top end shown in FIG. 4. As will be noted, a link 44 of the side member 24 also shown in dash lines at the top end in FIG. 4 seats far enough into the hook shape to permit the metal spring 36 to snap back into its closed position (and also to be depressed back down to its dash position for disconnect as will be is explained). A thumb notch 42 (FIG. 3) is provided in the outer hook shape end 34 to aid in depression of the metal spring 36.

It will be appreciated that the cable-type cross member 26 can be readily secured to a link-type side member 24 by simply positioning a link 44 of the side member 24 against the metal (e.g., leaf spring 36 (illustrated at the bottom end of the cross member in FIG. 4), applying pressure to depress spring 36 (see arrow) and then sliding the links 44 into the hook portion 34 until the spring 36 is released, at which point the spring snaps back into the closed position as shown (referred to as a snap lock). Release of the securement device from the side member 24 is achieved manually. The vehicle operator presses his thumb (or an available tool, e.g., screwdriver, pliar) against the distal end of the spring 36 as enabled by notch 42 to flatten the spring against the bottom of the hook shape (dash line position at the top end of FIG. 4) and thereby permitting sliding of the link 44 from the hook shape of the connector or securement device 28.

Reference is now made to FIGS. 5–7 showing a further embodiment of the invention. FIGS. 5–7 illustrate a securement device 46 that is designed to secure a link-type cross member 26' to a link-type side member 24. As shown in FIGS. 5 and 6, a claw-type link connector 48 is similar to the connectors which are currently in use. However, with the current versions, the hook portions 50 are simply squeezed together, e.g., using a specialized pliar-type tool, to lock the link of the side members to the connector. In the present invention, a spring clip 52 is biased across the opening of the link as shown. Again the spring 52 is pressed down by the link 44 of the side member 24 for permitting entry of link 44 into the hook-shaped end as indicated by the arrow in FIG. 7. The spring 52 snaps back across the opening for interlocking the side and cross members as illustrated in FIGS. 5 and 6. The device is disconnected, again by an operator pressing his thumb across the bar boss 54 of the spring to enable the hook portion 50 to be released from the side member 24.

Figure 10:
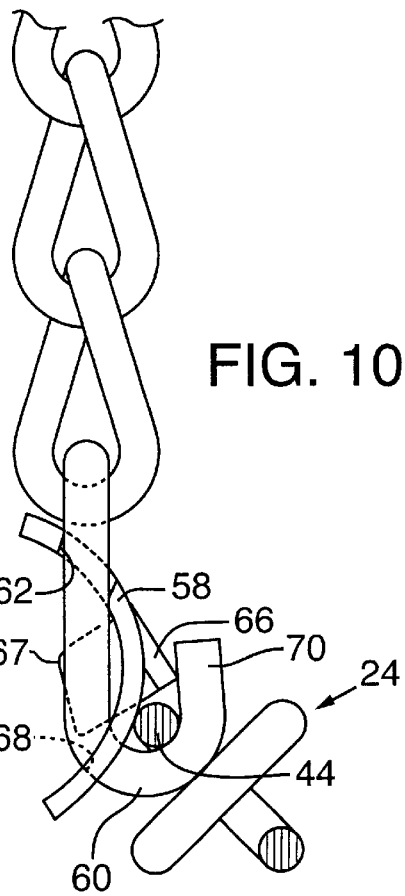
FIGS. 8, 9, 10 and 11 illustrate a snap lock configuration of a still further embodiment of the invention.
Figure 11:
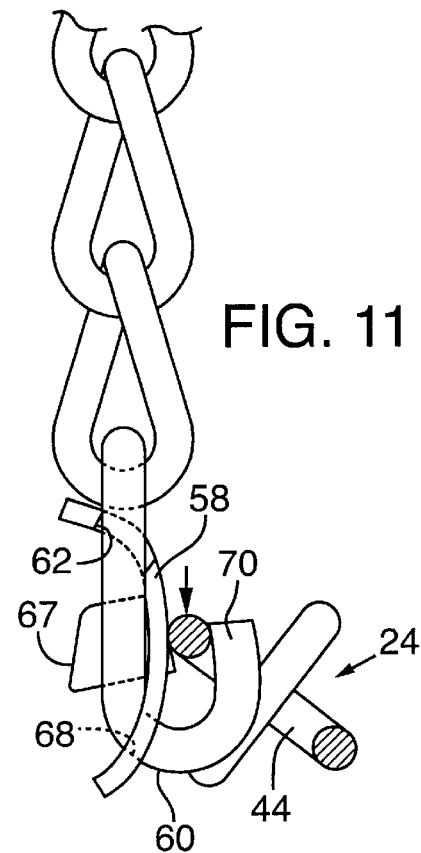
Figure 9:
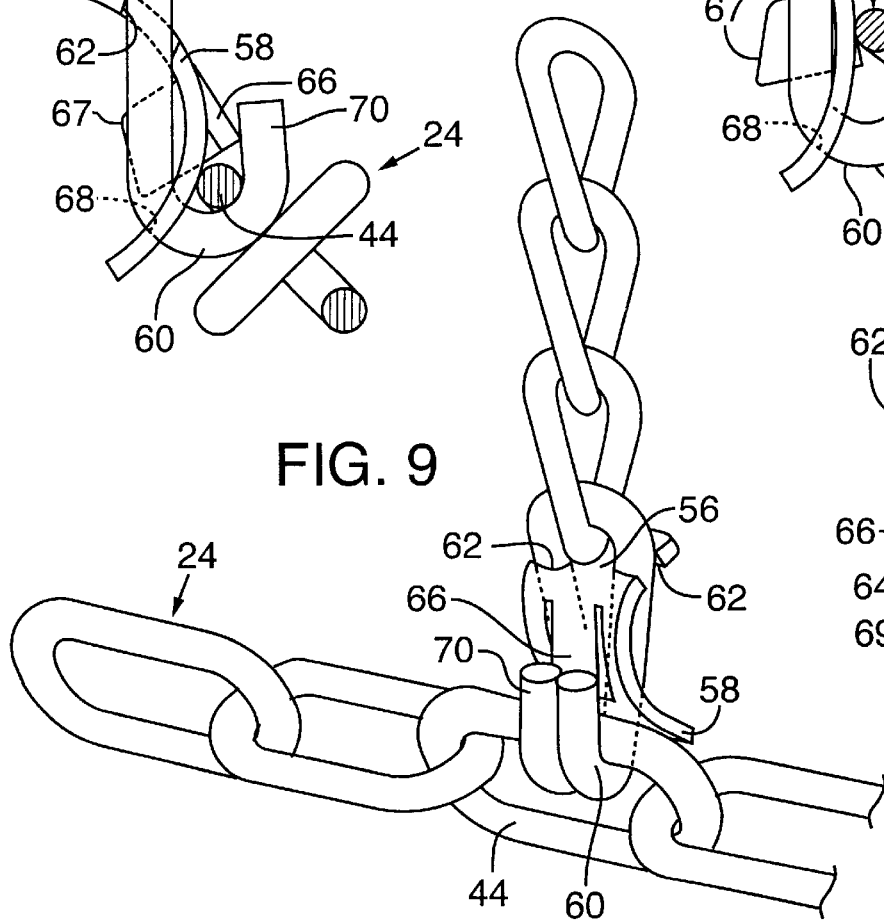
Figure 8:
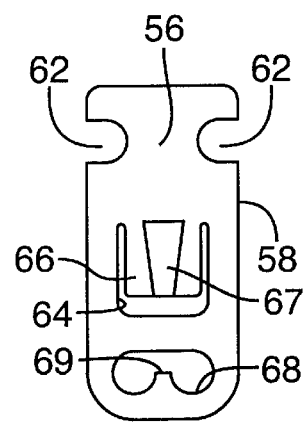
Figure 12A:
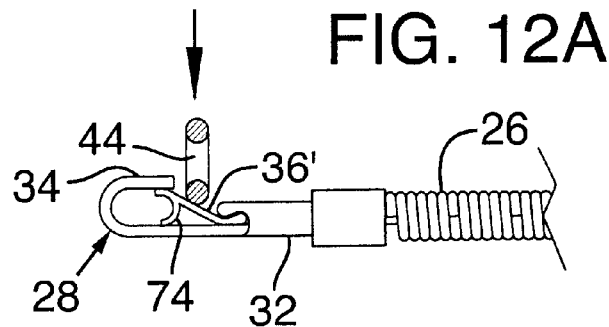
FIGS. 12A, 12B, 13A, and 14A illustrate a snap lock configuration of a still further embodiment of the invention.
Figure 12B:
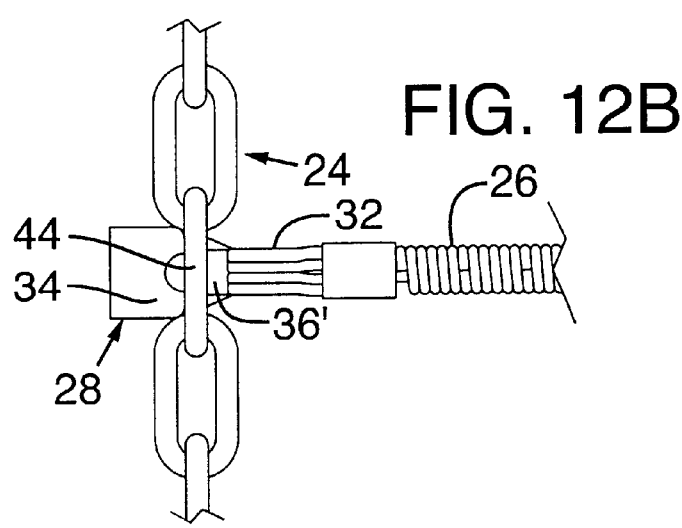
Figure 13A:
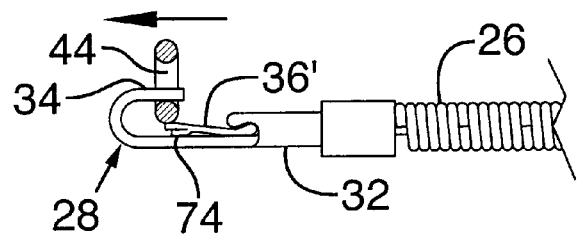
Figure 14A:
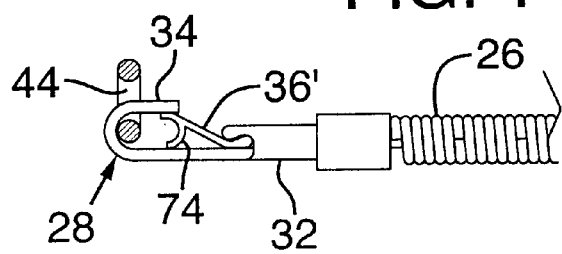

FIGS. 8–11 illustrate a further embodiment applicable to a link-type cross member connected to a link-type side member. FIG. 8 is an elastomeric spring 58 and FIG. 9 illustrates an alternative claw-type link connector 60. The spring 58 is configured at one end with notches 62. At an intermediate position, the elastomer spring is configured with a cut out 64 forming a tongue 66 and having a locator/reinforcement boss 67. At the opposite end, the spring is provided with an opening 68 including a stabilizing tip 69. As shown in FIG. 9, the spring is secured to the loop 56 of the connector 60 via the notches 62 at said one end and the opening 68 allows the opposite end to be forced over end 70 of the connector. (See also FIG. 10 which shows spring pad 58 as it appears both before and after assembly to link 44 of side member 24.) Link 44 is forced against the elastomer spring as seen in FIG. 11 (and note arrow) to compress the spring 58 as seen in FIG. 11 to position the link 44 inside the hook portion of connector 60 as seen in FIGS. 9 and 10. The tongue 66 with locator/reinforcement bars 67 juts up against the link 44 and resists disconnection as noted in FIG. 10. Again the operator places a thumb against the spring 58 to compress the spring and permit removal of the link 44.

FIGS. 12A, 12B, 13A and 14A illustrate use of a further elastomer-type spring to replace the metal spring of the embodiments of FIGS. 1–4. The spring 36' is shaped to form a C-shape at the distal end 74 to provide the desired biasing force to close off the opening to the hook end. As noted in the progression of FIGS. 12A, 13A and 14A, the link 44 of the link-type side member 24 is pressed against the distal end to collapse the end 74 of the spring (see arrow in FIG. 12A) and then slides under the hook end 34 (arrow in FIG. 13A) to snap lock the connector 32 and thus the cross member to the side member.

Figure 15A:
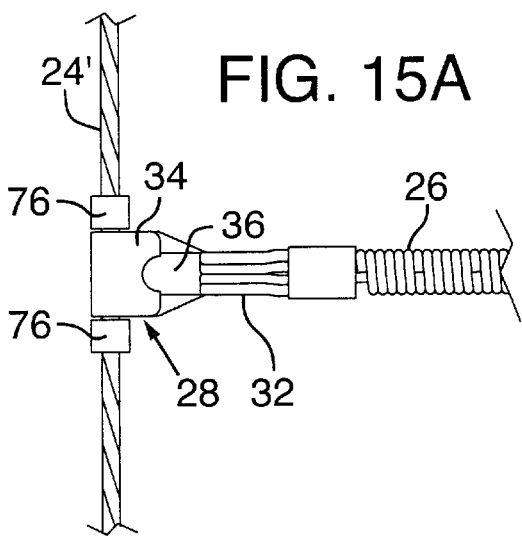
FIGS. 15A and 15B illustrate a still further embodiment.
Figure 15B:
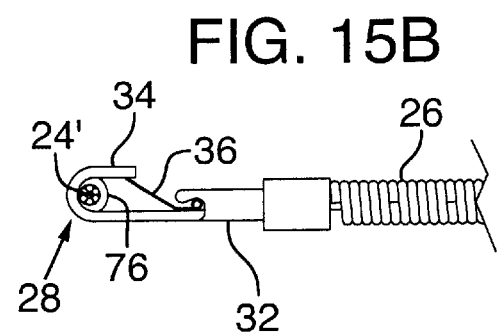

FIGS. 15A and 15B illustrate an embodiment whereby the securement device (connector) 28 of FIGS. 1–4 is applied to a cable-type side member 24'. As noted, this side member 24' is provided with bushings 76 that are crimped in place on the cable. The cable has a cross section mated to the hook-shaped end 34 of connector 28 (See FIG. 15B) and readily permits manipulation of metal spring 36.

Figure 16A:
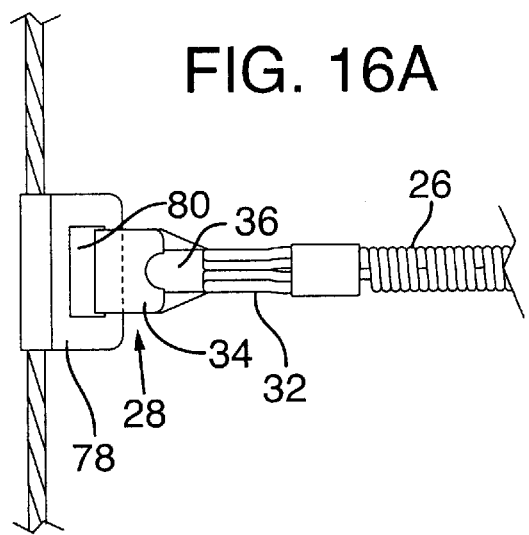
FIGS. 16A and 16B illustrate a still further embodiment.
Figure 16B:
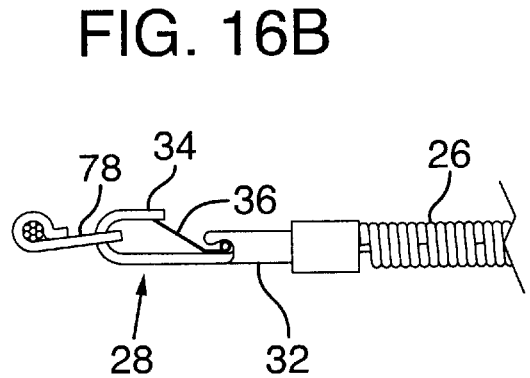

FIGS. 16A and 16B illustrate a further variation of FIGS. 15A and 15B. A metal plate 78 is clamped onto the cable-type side member. An eyelet 80 is provided in plate 78 for connection by the connector 28 of cross member 26.

FIGS. 17–20 illustrate a still further embodiment of the invention. In FIGS. 17–20, the connector portion 82 (FIG. 17) is a swivel-type connector that is secured to the side member 88 rather than the cross member as particularly noted in FIG. 17. A swivel shank 84 fits through the opening 20 of a link 86 of a link-type side member 88. A washer 90 is fitted over the hook end 92 of the shank 84, then elastomer pad 94 and a pivot plate 96. The hook end 92 is provided with finger openings 98 that receive fingers 100 of plate 96. The hook end 92 receives the end link 102 of a link-type cross member 104. As illustrated in FIG. 19, the pivot plate 96 is pressed down to provide an opening to the hook end and the end link is inserted as shown. Removal is provided by pressing the link 102 against the plate 96 to compress the elastomer pad 94 and permit disconnect of the side member. An advantage of this embodiment is that the shank 84 will swivel as indicated by the arrows 106 in FIG. 18. Thus, the cross member 104 can rotate or roll relative to the side member to relieve the twisting force otherwise applied to the connector (securement device). The rotation of the cross member allows the chain to wear on all sides increasing the effective life of the chain.

FIGS. 21 and 22 illustrate a connector similar to that of FIGS. 17–20 but having a coil spring 94' replacing elastomer pad 94.

FIGS. 23–25 illustrate a connector also similar to that of FIGS. 17–20 but replacing the pivot plate 96 with a floating gate-type washer 96'.

The above are but several of the embodiments that fall within the scope of the invention herein and will prompt others skilled in the art to conceive of numerous variations and modifications. For example, several combinations of springs are shown with each embodiment, but not all possible combinations. It should be appreciated that all the types of springs shown could be used with all the embodiments within the scope of the invention. The invention is accordingly intended to be encompassed by the terms of the claims herein that broadly interpret in the common every day use thereof within the industry.

The invention claimed is:

1. A traction device for vehicle wheels comprising:
   side members and cross members connected together by securement devices, said securement devices each having opposed ends, one end connected to one of a side member and a cross member of said side members and cross members, and the other end releasably connected to the other of said side member and said cross member, said other end configured to have a hook-shape defining an enclosure portion and an opening to said enclosure portion, said opening and said enclosure portion sized to receive a connecting portion of the other of said side member and said cross member;
   a biasing member secured to said device and spring biased relative to said opening to close said opening, said biasing member exposed for manual deflection away from said opening whereby said other of said side member and said cross member can be releasably secured within said enclosure portion and selectively and manually released from said enclosure portion enabling replacement of the cross member.

2. A traction device as defined in claim 1 wherein said cross members are cable-type cross members and said side members are link-type side members, said securement device secured to said cross members and releasably secured to said side members, said openings to said enclosure portions receiving a link of said side members for snap locking said securement devices to said link-type side members.

3. A traction device as defined in claim 2 wherein said securement devices are provided by flat plates having a curved end portion forming said hook shape and opposed end portion curled around a longitudinal axis and crimped onto said cable-type cross member, and a metal spring having one end anchored to the opposed end portion and having a distal end portion biased across the opening of said hook portion.

4. A traction device as defined in claim 3 wherein said curved end portion has an inset for enhancing exposure of said distal end to manual depression.

5. A traction device as defined in claim 1 wherein said securement devices are links having a loop end and a hook end, a spring member having an end engaged at said loop end and extended across said open end and spring biased across said hook end opening.

6. A traction device as defined in claim 5 wherein said spring members are wire springs having end fingers inserted in finger holes of said links and formed into a loop having a loop end biased across said hook opening.

7. A traction device as defined in claim 5 wherein said spring members are elastomer springs having one end anchored to said loop end and an opposite end anchored to the hook end and an intermediate bulged portion spanning the opening to said hook end and depressible for insertion and removal of the other of said side and cross members.

8. A traction device as defined in claim 7 wherein said intermediate portion of said elastomer springs is configured to have a tongue portion that projects from said bulged portion and engages and resists passage of the loop out through the opening.

9. A traction device as defined in claim 2 wherein said biasing member is a metal spring.

10. A traction device as defined in claim 2 wherein said biasing member is an elastomeric tongue having a compressible fork-shaped distal end that closes said opening.

11. A traction device as defined in claim 1 wherein the securement devices are provided by flat plates having a curved end portion forming said hook shape and an opposed end portion curled around and crimped onto a cable-type cross member, and a metal leaf spring having one end anchored to the opposed end portion and having a distal end biased across the opening to said hook portion, said side member also being a cable-type side member.

12. A traction device as defined in claim 11 wherein a pair of bearing members are spaced apart and crimped onto the cable-type side members, said hook shape located between said bearing members and preventing sliding of said hook shape along said cable-type side members.

13. A traction device as defined in claim 11 wherein a receiving plate is secured to a cable-type cross member, said receiving plate having an eyelet for receiving the hook shape of said securement member.

14. A traction device as defined in claim 1 wherein said securement device is a shank having an enlarged first end and a hook shape receiving end, the hook shape end fitted through a loop of a link-type member and a compression spring fitted between the loop and the hook shape and biased toward the hook shape to close the hook opening, said spring compressible to receive and release the other member.

15. A traction device as defined in claim 14 wherein a flat, rigid plate overlies the compression spring and is pivotally connected to the securement device, said plate engaging said springs and exposed for manual pivoting to compress the spring and thereby open the hook shape to insert and remove the other member.

16. A traction device as defined in claim 14 wherein said first end is configured to permit swivel movement of the hook shape and thereby rolling movement of the cross member relative to the side members.

17. A traction device for vehicle wheels comprising:

side members and cross members connected together by securement devices, said securement devices each having opposed ends, one end connected to one of said side and cross members and the other end releasably connected to another of said side and cross members;

said securement devices configured to have an enclosure portion for seating said other end with the traction device mounted to a tire, and an opening that permits entry and exit of said other end for insertion and seating of the other end in the enclosure portion with the traction device separated from the tire; and a biasing member that resists and does not prevent movement of said other end through said opening.

* * * * *